United States Patent
Otsuki et al.

(10) Patent No.: US 7,221,529 B2
(45) Date of Patent: May 22, 2007

(54) MAGNETIC HEAD DRIVING CIRCUIT AND MAGNETIC DISK DEVICE

(75) Inventors: Mitsuo Otsuki, Tokyo (JP); Hiroshi Kiyono, Tokyo (JP); Nobutaka Nishio, Tokyo (JP); Hiroki Matsukuma, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/068,777

(22) Filed: Mar. 2, 2005

(65) Prior Publication Data

US 2005/0195513 A1 Sep. 8, 2005

(30) Foreign Application Priority Data

Mar. 4, 2004 (JP) ............................. 2004-061413

(51) Int. Cl.
*G11B 5/09* (2006.01)
*G11B 5/02* (2006.01)
*G11B 21/02* (2006.01)

(52) U.S. Cl. .............................. 360/46; 360/68; 360/75
(58) Field of Classification Search .................... None
See application file for complete search history.

(56) References Cited

U.S. PATENT DOCUMENTS

| | | | | |
|---|---|---|---|---|
| 5,384,671 A | * | 1/1995 | Fisher | ......................... 360/51 |
| 5,898,532 A | * | 4/1999 | Du et al. | ....................... 360/46 |
| 5,991,113 A | | 11/1999 | Meyer et al. | |
| 2002/0141094 A1 | * | 10/2002 | Suzuki et al. | ................. 360/68 |
| 2005/0046985 A1 | * | 3/2005 | Morinaga et al. | ............. 360/31 |

FOREIGN PATENT DOCUMENTS

| | | |
|---|---|---|
| JP | 4-366408 | 12/1992 |
| JP | 64-27079 | 1/1999 |
| JP | 2001-56902 | 2/2001 |
| JP | 2003-157505 | 5/2003 |

* cited by examiner

*Primary Examiner*—Andrew L. Sniezek
(74) *Attorney, Agent, or Firm*—Oblon, Spivak, McClelland, Maier & Neustadt, P.C.

(57) ABSTRACT

The invention is directed to a magnetic head driving circuit and a magnetic disk device which achieve a low flying-height with thermal protrusion and thus a reliable write operation on the magnetic disk. The write circuit 3 receives the write data signal Sw inputted therein, and generates and outputs the write voltages Wx, Wy based upon the inputted signal. The write voltages Wx, Wy are composed of a preamble portion T1, a sink mark T2 and a user data portion T3 in each sector for magnetic recording. In the write voltage, the frequency f2 of the signal in the preamble portion T1 is higher than half the frequency f1 of the signal in the user data portion T3.

11 Claims, 13 Drawing Sheets

MAGNETIC HEAD DRIVING CIRCUIT AND MAGNETIC DISK DEVICE

TECHNICAL FIELD

The present invention relates to a magnetic head driving circuit and a magnetic disk device. More particularly, the invention relates to the improvement in a magnetic head driving circuit.

BACKGROUND OF THE INVENTION

A flying thin-film magnetic head is ordinarily provided with a write element (an induction-type electromagnetic conversion element) and a read element at the air flowing-out end of the slider. The induction-type electromagnetic conversion element is covered with a protective film. The protective film, which is made of an inorganic insulating material such as alumina, forms the most outside layer at the air flowing-out end.

The induction-type electromagnetic conversion element comprises first and second magnetic films, a gap film, a coil film, an insulating film and the like. In the first and second magnetic films, the end portions at the air bearing surface (hereinafter, referred to as ABS) of the slider face each other over a gap film, so as to form a write pole portion.

And the second magnetic film extends to the rear of the ABS as keeping a space between the first and second magnetic films, and is coupled with the first magnetic film at the rear joint portion.

The coil film is wound in a spiral shape around the rear joint portion, passing through a space (inner gap) between the first and second magnetic films. Both ends of the coil film are led to the outside via terminal conductors (bump). The insulating film fills up the inner gap between the first and second magnetic films. The coil film is buried inside this insulating film. And the second magnetic film is formed on the surface of the insulating film.

In the thin-film magnetic head described above, a write current is supplied to the coil film of the induction-type electromagnetic conversion element to write information on the magnetic disk.

In supplying the write current to the coil film of the induction-type electromagnetic conversion element, the coil film generates heat due to Joule effect. Since the coil film is buried inside the insulating film of an organic insulating material or the like and the whole including the insulating film is covered with the protective film of alumina or the like, the coil film has a poor dispersion of the heat generated therein. Consequently, the heat generated in the coil film is confined inside, which causes thermal expansion of the coil film and the insulating film.

In addition to this heat generation of coil, there is a problem of heat generation due to the eddy-current loss in the core. The heat generation due to the eddy current loss causes the thermal expansion of the magnetic film, and the heat generation increases as the frequency of the current becomes higher. Consequently, a measure to counter this problem is a very important problem at the present time when a write current tends to be made higher and higher in frequency to cope with the speedup of transfer rate.

The protective film is pushed out and swollen out to the outside due to the thermal expansion force of these coil film, insulating film and magnetic film. And the swelling-out of the protective film reaches the ABS also and the ABS results in being swollen out in an area in which the induction-type electromagnetic conversion element exists. And due to the above-described heat generation, the first and second magnetic films expand thermally and their pole portions pressed by a weaker force at the ABS side are swollen out. The amount of swelling-out of them sometimes reaches a height of 10 nm.

In a magnetic disk device with this kind of thin-film magnetic head, the flying-height between the magnetic disk surface and the ABS of the thin-film magnetic head has been gradually reduced to be 40 nm, 30 nm, 20 nm or 10 nm in order to meet the demand for high-density recording. Thus, a protrusion in the ABS as described above is liable to bring a head crash, damage of a magnetic disk, destruction of magnetic recording data and the like, and comes into a very serious problem from the viewpoint of reliability of a magnetic disk device.

Another problem attendant to the heat generation is a failure generated at a part to be the forefront in recording. That is to say, as known publicly, the write current supplied to the thin-film magnetic head is composed of a preamble portion, a sink mark portion and a user data portion in each sector of magnetic recording. These are serial data arranged in time series.

In the forefront part immediately after the start of write operation, however, it is not ensured to secure a sufficient thermal protrusion and satisfactory write characteristic beginning in the forefront of the user data portion. Thus, errors are liable to happen.

In order to solve the above-described problems, various means have been proposed up to now. These means are classified into a type of suppressing thermal protrusion and a type of positively utilizing thermal protrusion as admitting it. A type of suppressing a thermal protrusion includes the following approaches:

(1) an approach of reducing the amount of generated heat by reducing the resistance value of a coil;
(2) an approach of improving the effect of heat radiation by reducing the thickness of an alumina film and the like existing under a write element;
(3) an approach of reducing an eddy-current loss by making a core small; and the like.

However, any of these approaches cannot provide a sufficient effect due to restrictions caused by the structure of a magnetic head.

As a type of positively utilizing thermal protrusion, as seen in the specification of U.S. Pat. No. 5,991,113, there has been known a technique of producing thermal protrusion before a write operation by burying a heater member in a protective film. However, this structure cannot avoid a problem of needing to have a heater member buried in particular.

JP 4-366,408A has disclosed a technique of providing a depression in advance in the medium facing surface of an inorganic insulating protective film. This depression is formed in which the medium facing surface of the protective film is made swollen out in advance in consideration of the amount of protrusion caused by thermal expansion of the insulating film and a flattening process is performed on the medium facing surface.

This prior art is based on an idea in that the protrusion caused by the thermal expansion is admitted, not suppressed and the portion to protrude is simply made retreated in advance to prevent the protrusion of ABS due to thermal expansion. Consequently, the prior art does not provide a means of completely solving the protrusion due to thermal expansion.

As described above, since it is difficult to completely suppress the protrusion caused by thermal expansion, the prior art has taken a technique in that the protrusion caused by thermal expansion is admitted and the flying-height is increased to a height value enough for the prevention of head crash. This impedes high-density recording.

SUMMARY OF THE INVENTION

An object of the present invention is to provide a magnetic head driving circuit and a magnetic disk device which achieve a low flying-height with thermal protrusion and thus a reliable write operation on the magnetic disk.

In order to achieve the above object, a magnetic head driving circuit according to the present invention comprises a write circuit. The write circuit receives a write data signal inputted thereto, generates a write current based upon the inputted signal and outputs the write current. The write current includes a preamble portion and a user data portion in each sector for magnetic recording. The preamble portion is a section for preparation. The user data portion is a portion for data to be recorded and is generated after the preamble portion in time series.

The present invention is characterized in that the frequency f2 of the signal in the preamble portion is higher than half the frequency f1 of the signal in the user data portion in the above-described configuration.

Up to now, the frequency f2 of the signal in a preamble portion has been set at a value half the frequency f1 of the signal in the user data portion, and it has not ensured a sufficient thermal protrusion and good write characteristic in the forefront portion immediately after the start of write operation. Thus, errors have been likely to happen.

In the present invention, the frequency f2 of the signal in the preamble portion is higher than half the frequency f1 of the signal in the user data portion. Thus, in the forefront portion immediately after the start of write operation, heat generation is accelerated by the high frequency of the write current in the preamble portion. Consequently, sufficient thermal protrusion is achieved until the beginning of the user data portion. This ensures a low flying-height and resultant high write characteristic in the write operation.

From the viewpoint of fitting a write current to a write data signal in phase, it is preferable that the frequency f2 of the signal in the preamble portion is an integral multiple of half the frequency f1 of the signal in the user data portion.

In another aspect of magnetic head driving circuit according to the present invention, the frequency f2 of the signal in the preamble portion may include a harmonic f3 of the frequency that is half the frequency f1 of the signal in the user data portion, the harmonic f3 being superimposed on the frequency f2. In this case, the magnetic head driving circuit receives a write data signal and a clock signal. The inputted clock signal, which is at a frequency of the harmonic f3, is combined with the write data signal to form a write current, and the write current is outputted. The frequency f2 of the signal in the preamble portion may be the same as half the frequency f1 in the signal in the user data portion. This aspect of magnetic head driving circuit provides effects similar to those of the previously-described aspect.

The magnetic head driving circuit of the present invention may further comprise a read circuit.

The magnetic head driving circuit of the present invention is combined with a magnetic head and a magnetic disk to form a magnetic disk device. In this case, the magnetic head provides magnetic recording onto the magnetic disk by means of the write current that is supplied from the magnetic head driving circuit.

Other features of the present invention and an action and effect brought by them are described in more detail with reference to the accompanying drawings by means of embodiments.

BRIEF DESCRIPTION OF THE DRAWINGS

FIG. 4(A) shows a conventional example, and FIG. 4(B) shows the present invention.

DESCRIPTION OF THE PREFERRED EMBODIMENTS

Figure 1:
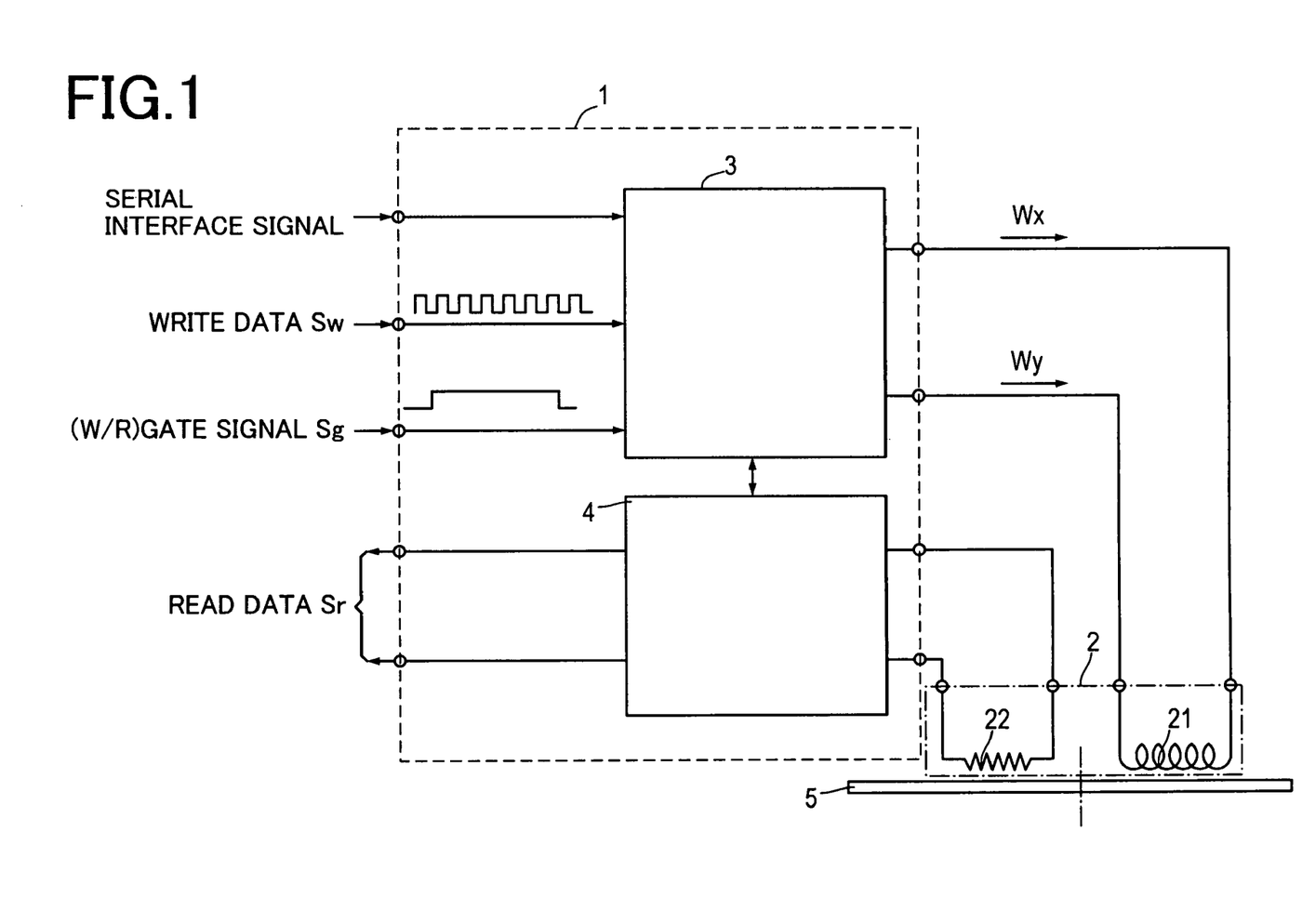
FIG. 1 shows a circuit configuration of a magnetic disk device having a magnetic head driving circuit according to the present invention.
Figure 2:
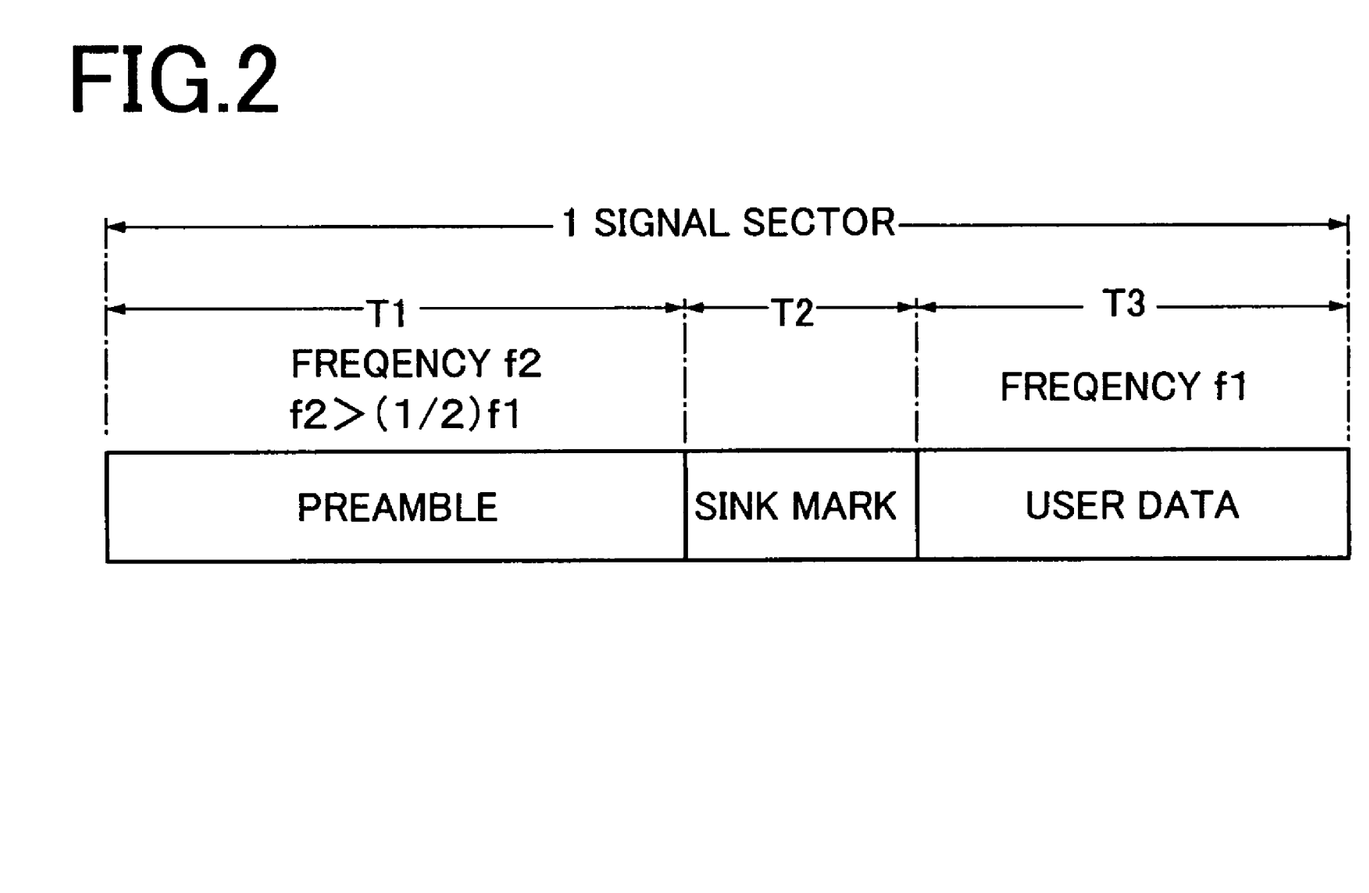
FIG. 2 shows the configuration of the forefront sector.

FIG. 1 shows a first embodiment of a magnetic disk device having a magnetic head driving circuit according to the present invention, and FIG. 2 shows the configuration of a basic single sector. First, referring to FIG. 1, a magnetic head driving circuit 1 comprises a write circuit 3 and a read circuit 4, and is combined with a magnetic head 2 and a magnetic disk 5 to form a magnetic disk device.

The magnetic head 2 provides the magnetic disk 5 with magnetic recording by means of the action of a write current Iw generated by write voltages Wx and Wy supplied from the magnetic head driving circuit 1.

The magnetic head 2 has a write element 21 and a read element 22. The write element 21 is generally formed out of an induction-type electromagnetic conversion element, and the read element 22 is formed out of a giant magnetoresistance effect element (hereinafter, referred to as GMR) such as a spin valve film (hereinafter, referred to as a SV film) or a ferromagnetic tunnel junction element (hereinafter, referred to as a TMR element).

A write data signal Sw, a serial interface signal and a (W/R) gate signal Sg are inputted into the write circuit 3, and write voltages Wx and Wy are outputted on the basis of the inputted signals. The write data signal Sw is a signal of frequency f1. The serial interface signal is used for setting overshoot of a write current, setting a read current and the like. The (W/R) gate signal Sg instructs to turn ON or OFF a write operation and a read operation. And a read data signal Sr obtained by processing a reproduction signal obtained by the read element 22 is outputted from the read circuit 4.

FIG. 2 shows the configuration of a basic single sector, and each sector is composed of a preamble portion T1, a sink mark portion T2 and a user data portion T3. These are serial data arranged in time series.

The preamble portion T1 is a preparation section for making it possible to read the output of the magnetic head 2. The sink mark portion T2 is data beginning position information for showing that the part after this is data. The user data portion is a part for data to be recorded, and as a matter of course this user data portion T3 is generated after the preamble portion T1 in time series.

The present invention is characterized in that the signal in the preamble portion T1 is at a frequency f2 higher than half the frequency f1 of the signal in the user data portion T3.

Up to now, the frequency of the signal in the preamble portion T1 has been set at a value lower than the frequency f1 of the signal in the user data portion T3, concretely, a value half the frequency f1, and it has not ensured a sufficient thermal protrusion and good write characteristic in the forefront portion immediately after the start of write operation. Thus, errors have been likely to happen.

In the present invention, the frequency f2 of the signal in the preamble portion T1 is set at a value higher than half the frequency f1 of the signal in the user data portion T3, or a harmonic f3 of the frequency that is half the frequency f1 of the signal in the user data portion T3 is superimposed on the frequency f2. Thus, in the forefront portion immediately after the start of write operation, heat generation is accelerated by the high frequency of the write current in the preamble portion. Consequently, sufficient thermal protrusion is achieved until the beginning of the user data portion. This ensures a low flying-height and resultant high write characteristic in the write operation.

Figure 3:
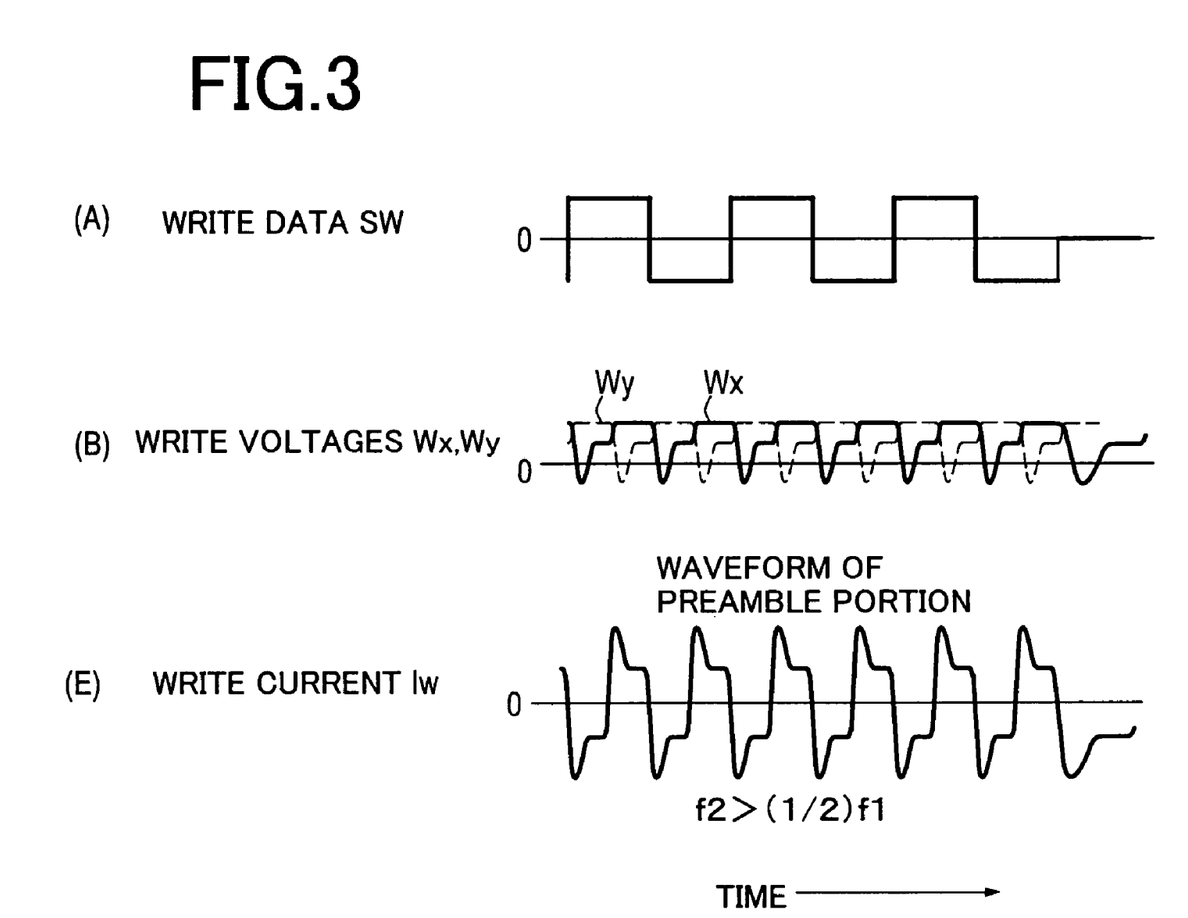
FIG. 3 is a waveform diagram related to a first embodiment according to the present invention.

FIG. 3 shows waveforms in case of applying the first embodiment of the present invention to the preamble portion T1. In FIG. 3, the frequency f2 of the signal in the preamble portion T1 is 400 MHz, which is twice the half of the frequency f1 (400 MHz) of the signal in the user data portion T3.

In FIG. 3, in a conventional case, when an R/W gate signal Sg is given, write data SW is taken into the write circuit 3 and write voltages Wx and Wy (see FIG. 3(B)) are outputted by signal processing inside the write circuit 3, and the difference between the write signal voltages Wx and Wy forms a write current Iw.

In the prior art, the write current Iw at a frequency (200 MHz), which is half the frequency f1 (400 MHz) of the signal in the user data portion T3, is supplied to the write element 21 in the preamble portion T1. In the first embodiment of the present invention, the write current Iw at the frequency f2 (400 MHz in this case), which is higher than half the frequency f1 (400 MHz) of the signal in the user data portion T3, is supplied to the write element 21 in the preamble portion T1 (see FIG. 3(E)). Thus, high-frequency operation of the write current Iw is done in the preamble portion T1.

The above waveform control process is intended mainly for the forefront portion that is immediately after the start of the write operation on the use data portion. However, a similar process to this is performed in every sector.

Figure 4:
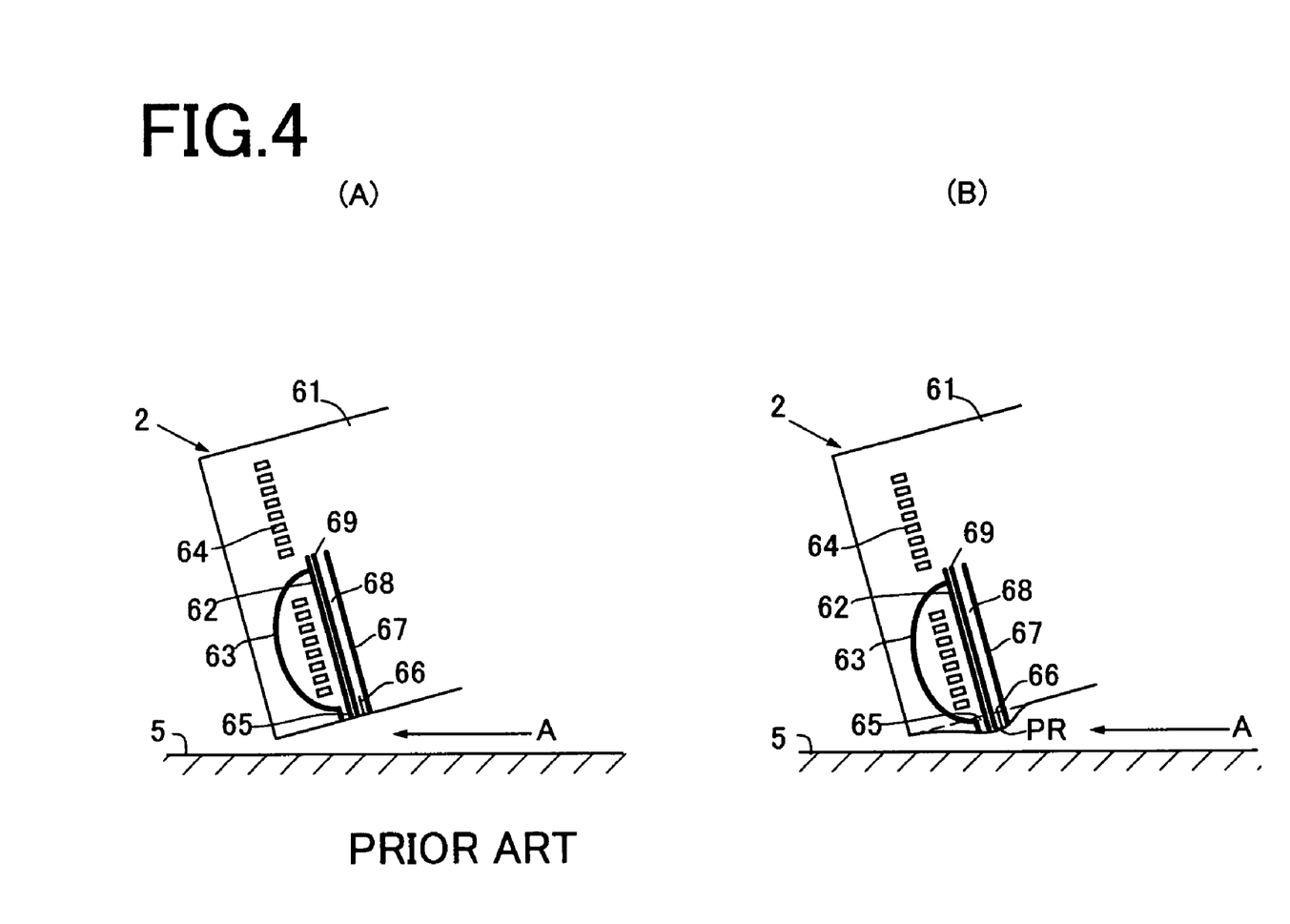
FIG. 4 shows thermal protrusion in the pole portion of the magnetic head.

FIG. 4 shows the state of a head in the forefront portion immediately after the start of the write operation on the user data portion, FIG. 4(A) shows the case of a conventional driving method, and FIG. 4(B) shows the case of the driving method according to the first embodiment of the present invention. The magnetic head 6 is provided with a write element and a read element 66 inside the slider 61. The write element includes a first magnetic film 62, a second magnetic film 63, a gap film 64 and a coil 65. The first and second magnetic films 62 and 63 form pole portions in the air bearing surface (hereinafter, referred to as ABS) and the pole portions perform the write operation. The read element 66, which is under the write element, is placed inside the insulating film 68 that is between the lower shield 67 and the upper shield 69.

In the conventional driving method, a protrusion PR caused by thermal expansion is not found in a pole portion of a magnetic head 6, as shown in FIG. 4(A).

On the other hand, in the first embodiment of the present invention, a protrusion PR is generated by the thermal expansion of the pole portion in the magnetic head 6, as shown in FIG. 4(B). Consequently, it is possible to secure a low flying-height and high write characteristic beginning in the forefront portion immediately after the start of the write operation on the user data portion.

Figure 5:
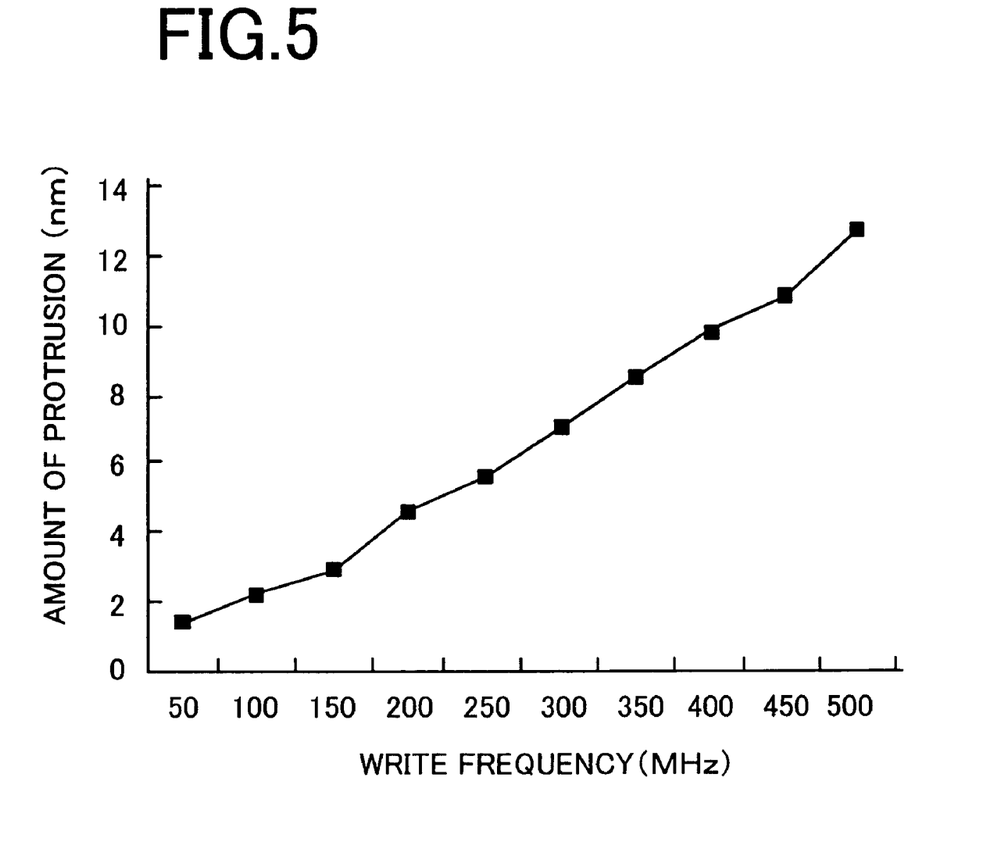
FIG. 5 shows the relation between the frequency of the write current and the amount of thermal protrusion.

FIG. 5 shows the relation between the frequency (MHz) of the write current and the amount of thermal protrusion. As shown in FIG. 5, as the frequency of the write current rises, the thermal protrusion amount increases. Therefore, a thermal protrusion can be generated by raising the frequency of the write current. Since the thermal protrusion amount is nearly proportional to the frequency of the write current, it is apparent that thermal protrusion is controlled by adjusting the frequency.

Figure 6:
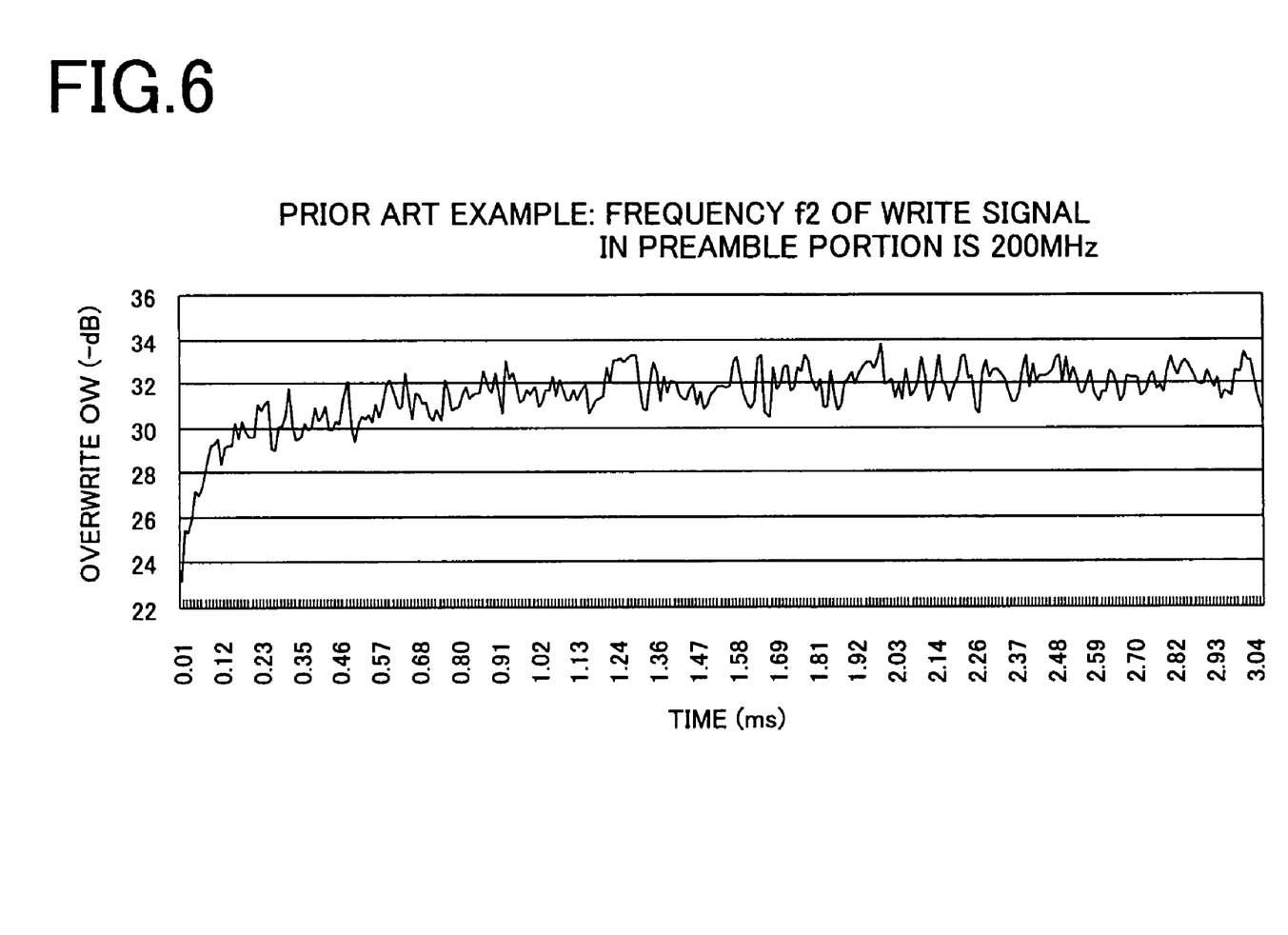
FIG. 6 shows an O/W characteristic obtained by a conventional magnetic head driving circuit.

Next, description is given with reference to actual measurement data. FIG. 6 shows an overwrite characteristic (hereinafter, referred to as O/W characteristic) obtained by a conventional write operation to the user data portion. The axis of abscissas represents time (second) and the axis of ordinates represents O/W characteristic (-dB).

In this case, the frequency f1 of a signal in the user data portion T3 is 400 MHz and the frequency f2 of a signal in the preamble portion T1 is 200 MHz. As shown in FIG. 6, the O/W characteristic in the forefront portion is low immediately after a write operation to the user data portion has been started, and rises with the lapse of time and becomes stable. Up to now, such variation in O/W characteristic with the lapse of time has caused an error in a magnetic disk device.

Figure 7:
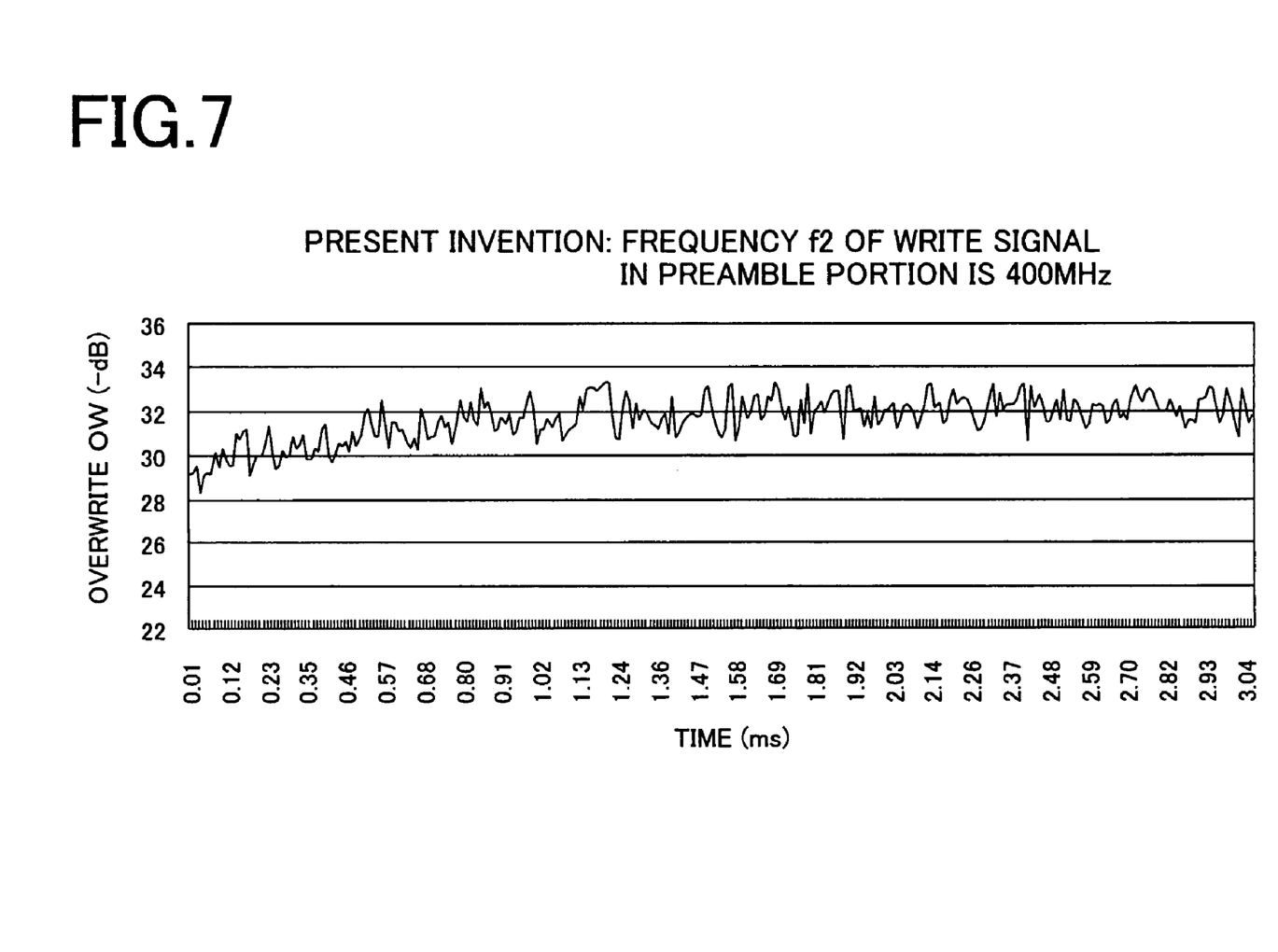
FIG. 7 shows an O/W characteristic obtained by a magnetic head driving circuit according to the present invention.

FIG. 7 shows an O/W characteristic obtained by a write operation according to the first embodiment of the present invention. In this example, the frequency f1 of the signal in the user data portion T3 is 400 MHz and the frequency f2 of the signal in the preamble portion T1 is 400 MHz. In short, the frequency f2 of the signal in the preamble portion T1 is twice the half of the frequency f1 of the signal in the user data portion T3.

As shown in FIG. 7, the O/W characteristic of the forefront portion is high immediately after a write operation to the user data portion has been started, and is stable after this. That is to say, since a protrusion PR is generated by thermal expansion of a pole portion of a magnetic head 6 in the forefront portion immediately after the start of the write operation on the user data portion, a low flying-height and high O/W characteristic is secured beginning in the forefront portion immediately after the start of the write operation on the user data portion.

Accordingly, in case that the frequency f2 of the signal in the preamble portion T1 is higher than half the frequency f1 of the signal in the user data portion T3, there has been confirmed the effect in that, in the forefront portion immediately after the start of the write operation on the user data portion, the protrusion PR is produced by thermal expansion of the pole portion of the magnetic head 6 and so, a low flying-height and high write characteristic is secured beginning in the forefront portion immediately after the start of the write operation on the user data portion.

Next, a second embodiment of the present invention is described. The second embodiment is the case in that, the frequency f2 of the signal in the preamble portion T1 includes a harmonic f3 of the frequency that is half the frequency f1 of the signal in the user data portion T3.

Figure 8:
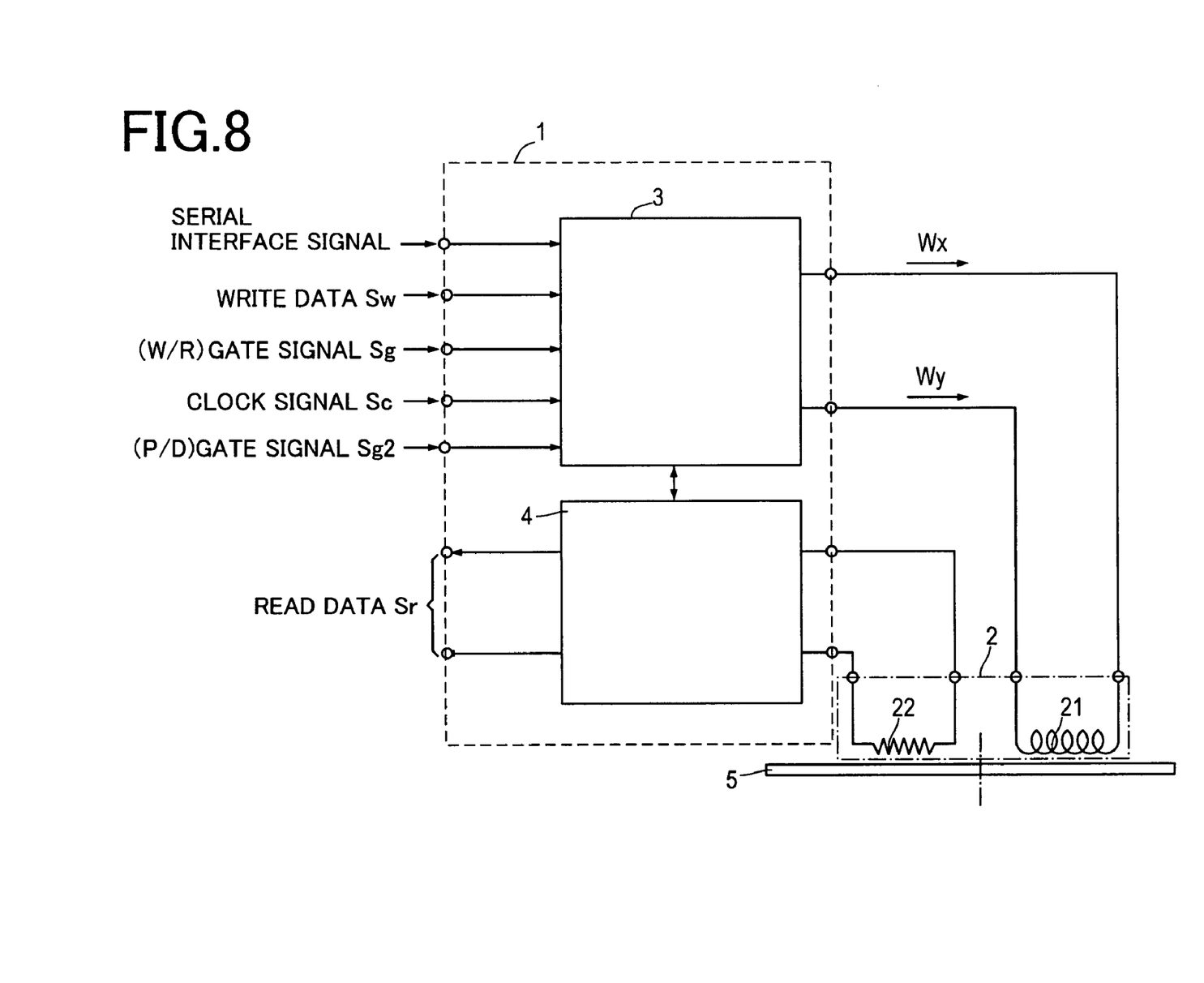
FIG. 8 shows a circuit configuration of a magnetic disk device using a magnetic head driving circuit according to a second embodiment of the present invention.

FIG. 8 shows the configuration of a magnetic disk device having a magnetic head driving circuit according to the second embodiment of the present invention. In FIG. 8, in comparison with the embodiment shown in FIG. 1, a clock signal Sc and a (P/D) gate signal Sg2 have been added as signals to be inputted to a write circuit 3.

Figure 9:
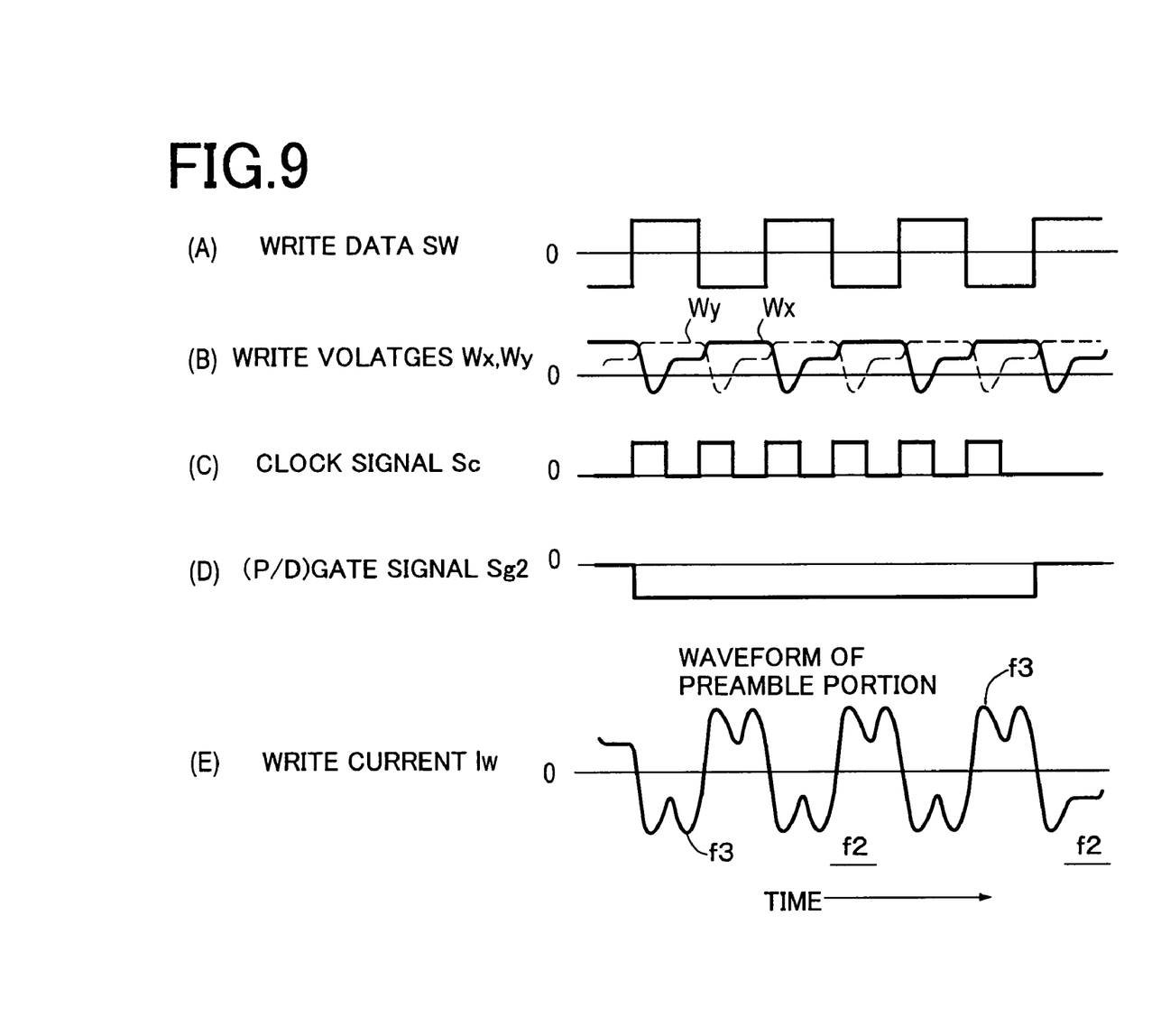
FIG. 9 is a waveform diagram in case of using the magnetic head driving circuit shown in FIG. 8.

FIG. 9 shows waveforms in the preamble portion in the second embodiment. The fundamental frequency f2 of the write data signal in the preamble portion T1 is 200 MHz, which is half the frequency f1 (400 MHz) of the signal in the user data portion T3.

The write current Iw shown in FIG. 9(E) is obtained as a result in that, for example, the harmonic f3 of the frequency that is half the frequency f1 of the signal in the user data portion T3 is superimposed on the frequency f2 that is a fundamental frequency of the write data signal in the preamble portion T1, when the (P/D) gate signal Sg2 is in a LOW state and the clock signal Sc is in a DOWN state as shown in FIG. 9.

Although it has been described with reference to FIG. 5 that the amount of heat generated increases as higher frequency of the write current, the amount of heat generated increases also in case that the waveform of the write current Iw has many peaks as in the write current Iw of FIG. 9(E).

In the second embodiment of the present invention, the harmonic f3 of the frequency that is half the frequency f1 of the signal in the user data portion T3 is superposed on the frequency f2 of the signal in the preamble portion T1. Consequently, in the forefront portion immediately after the start of the write operation on the user data portion, the protrusion PR is produced by thermal expansion of the pole portion of the magnetic head 6. Thus, a low flying-height and high write characteristic is secured beginning in the forefront portion immediately after the start of the write operation on the user data portion.

The above waveform control process is intended mainly for the forefront portion that is immediately after the start of the write operation on the use data portion. However, a similar process to this is performed in every sector.

Figure 10:
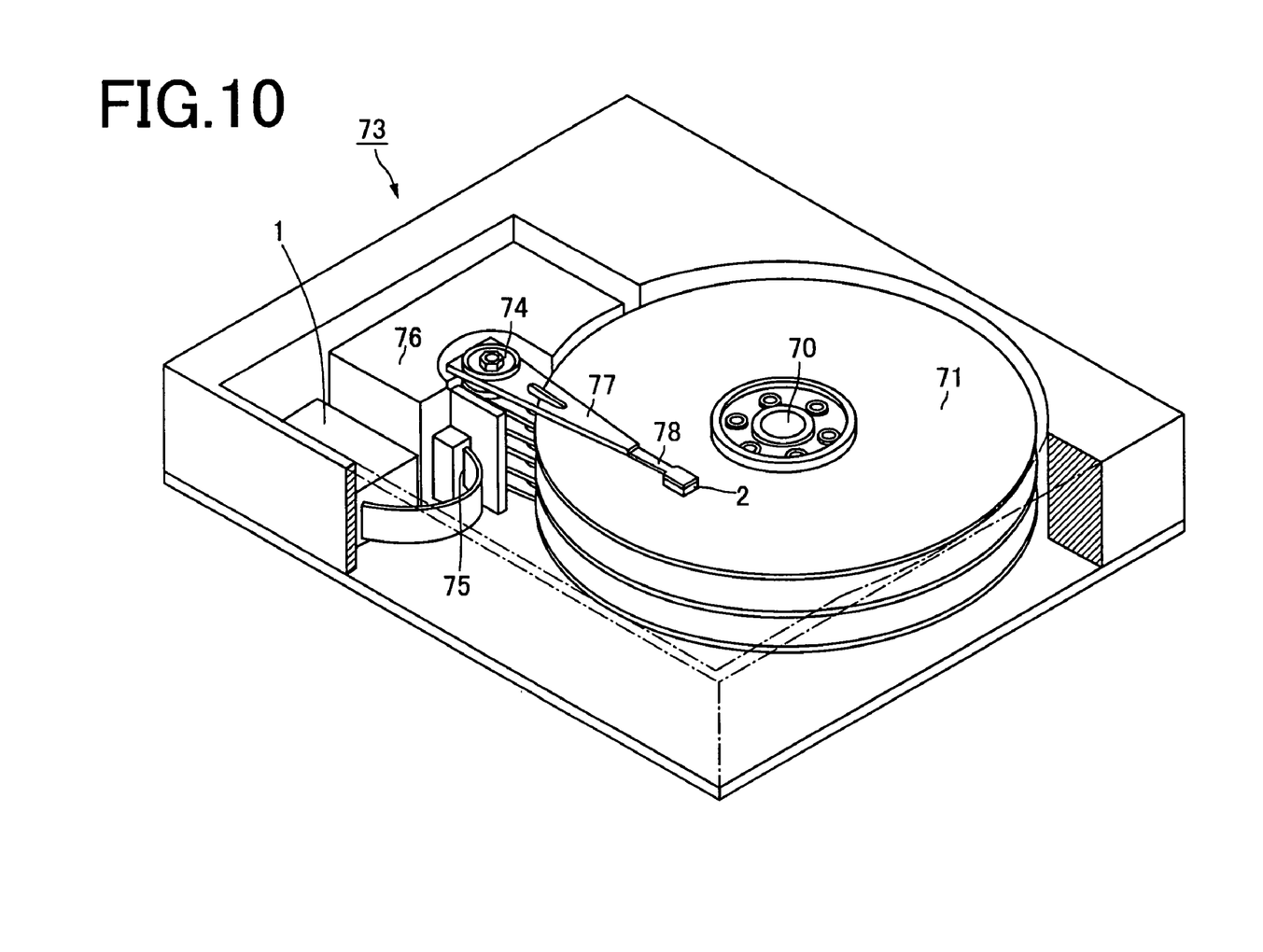
FIG. 10 is a perspective view showing a concrete structure of the magnetic disk device shown in FIG. 1 or 8.

FIG. 10 is a perspective view showing a concrete structure of a magnetic disk device shown in FIG. 1 or 8. A magnetic disk device shown is provided with a magnetic disk 5 provided so as to be capable of turning around a shaft 70, a thin-film magnetic head 2 for recording and reproducing information on the magnetic disk 5 and an assembly carriage device 73 for positioning the thin-film magnetic head 2 on a track of the magnetic disk 5.

The assembly carriage device 73 is composed mainly of a carriage 75 being capable of turning around a shaft 74 and an actuator 76 for driving the carriage 75 so as to turn, said actuator 76 being composed of a voice coil motor (VCM) for example.

The bases of a plurality of driving arms 77 stacked in the direction of the shaft 74 are attached to the carriage 75, and a suspension assembly 78 mounted with a thin-film magnetic head 2 is made to adhere to the fore-end of each driving arm 77. Each suspension assembly 78 is provided on the fore-end of a driving arm 77 so that a thin-film magnetic head 2 provided at the fore-end of the suspension assembly 78 is opposite to the surface of each magnetic disk 5. A magnetic head driving circuit 1 shown FIG. 1 or 8 is provided adjacently to the actuator 76. However, the magnetic head driving circuit 1 may be provided in the outside. The magnetic disk device shown in FIG. 10 brings the action and effect described with reference to FIGS. 1 to 9.

Figure 11:
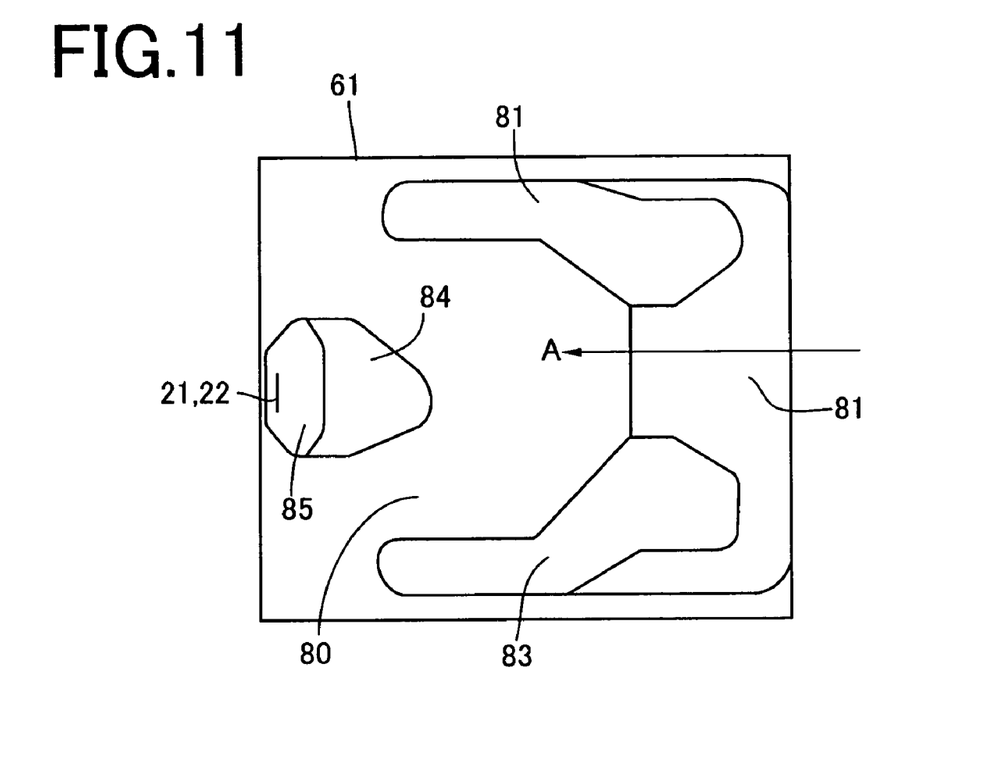
FIG. 11 is a plan view showing an example of a thin-film magnetic head being seen from the medium facing surface side.
Figure 12:
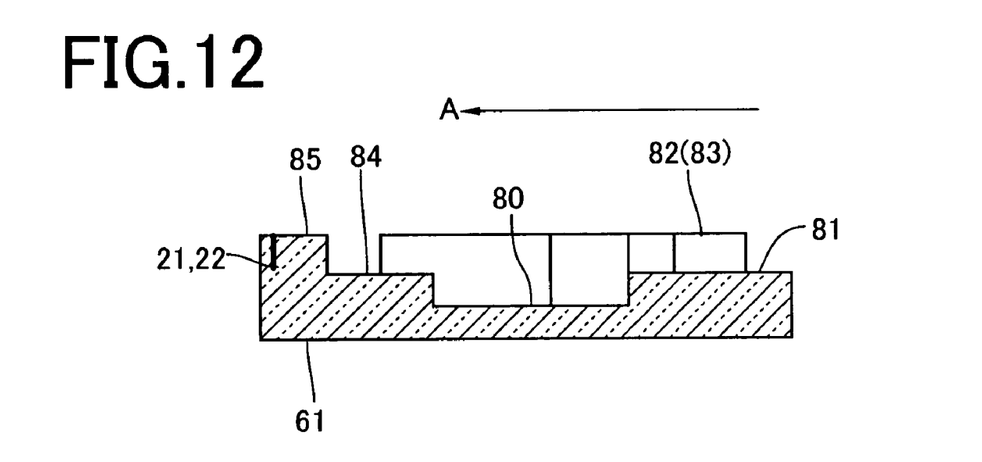
FIG. 12 is a sectional view of the thin-film magnetic head shown in FIG. 11.
Figure 13:
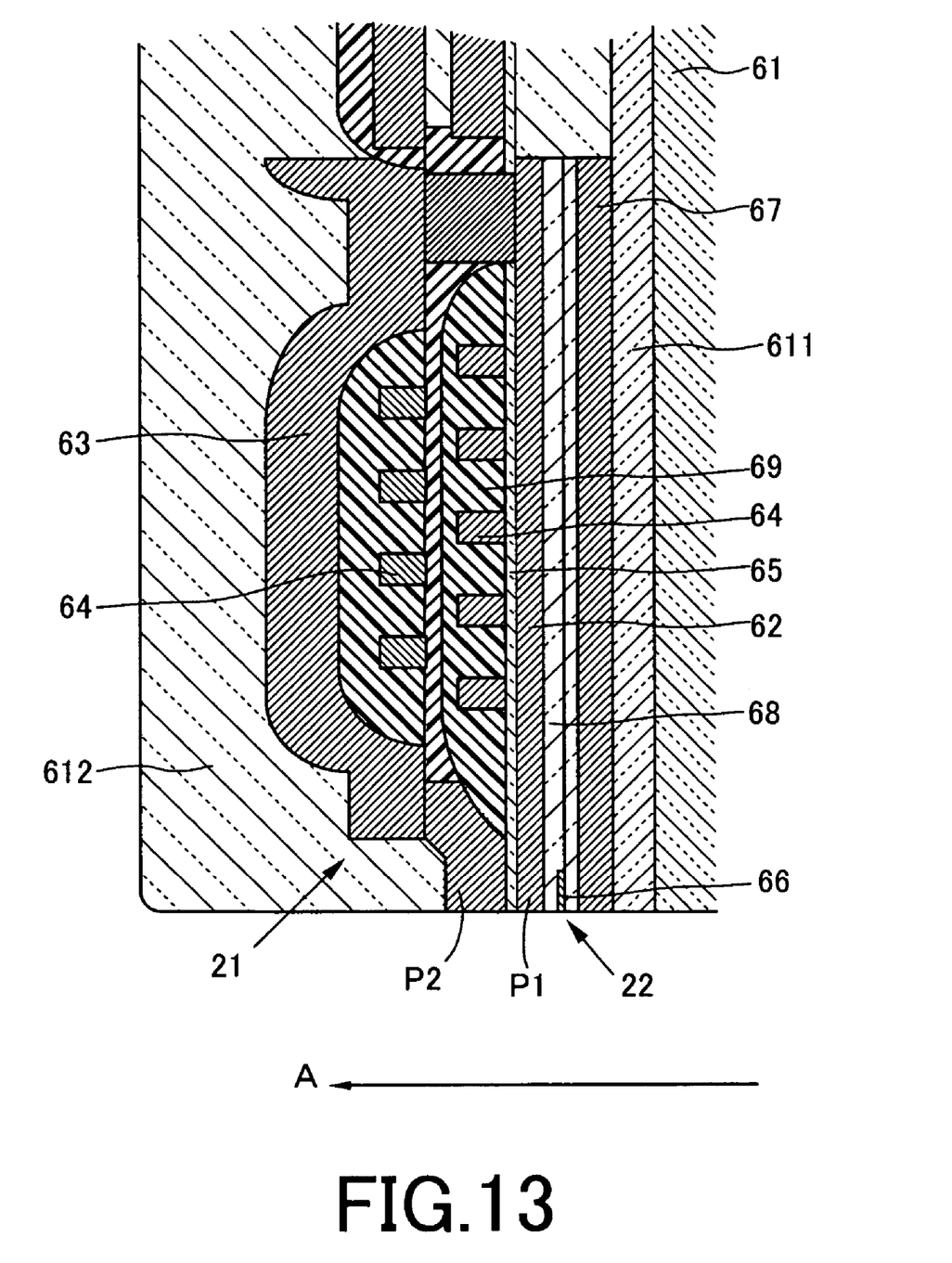
FIG. 13 is a magnified view showing an electromagnetic conversion element part of the thin-film magnetic head shown in FIGS. 11 and 12.

FIG. 11 is a plan view showing an example of the thin-film magnetic head shown in FIG. 10 in case of being seen from the medium facing surface side, FIG. 12 is a sectional view of the thin-film magnetic head shown in FIG. 11, and FIG. 13 is a magnified view of an electromagnetic conversion element part of the thin-film magnetic head shown in FIGS. 11 and 12. The thin-film magnetic head 2 shown comprises a slider base body 61, a write element 21 and a read element 22.

The slider base body 61 is formed out of a ceramic material, for example, Altic ($Al_2O_3$—TiC) and the like, and has a geometric shape for controlling a flying characteristic on its medium facing surface. As a typical example of such a geometric shape, this embodiment shows an example provided with a first step portion 81, a second step portion 82, a third step portion 83, a fourth step portion 84 and a fifth step portion 85 on the base face 80 of the slider base body 61. The base face 80 becomes a negative pressure generating portion relative to the direction of air flow shown by arrow A, and the second step portion 82 and the third step portion 83 form step-shaped air bearings rising up from the first step portion 81. The second step portion 82 and the third step portion 83 form an ABS.

The fourth step portion 84 rises up in the shape of a step from the base face 80 and the fifth step portion 85 rises up from the fourth step portion 84 in the shape of a step. The write element 21 and the read element 22 are provided on the fifth step portion 85.

Referring to FIG. 13, an insulating film 611 is provided on an end face of the slider base body 61. The insulating film 611 is formed out of an insulating material, for example, aluminum oxide ($Al_2O_3$), $SiO_2$ and the like, and is 1 to 5 μm in thickness.

The read element 22 comprises an MR element 66. The MR element 66 includes an SV film or a TMR film. In case of an SV film, a CIP type or a CPP type is used. The TMR film is originally used for making a sense current flow perpendicularly to its film surface.

The write element 21 is an induction-type electromagnetic conversion element, and its first pole portion for writing faces the ABS. The write element 21 is arranged in close vicinity of the MR element 66 and is covered with a protective film 612. The MR element 66 is arranged inside an insulating gap layer 68 between a first shield layer 67 and a second shield layer 62.

The write element 21 comprises a first magnetic layer 62, a second magnetic film 63, a recording gap layer 65 and a thin-film coil 64. The first magnetic layer 62 is magnetically coupled to the second magnetic film 63. The recording gap layer 65 is provided between a magnetic pole portion P1 of the first magnetic layer 62 and a second pole portion P2 forming the second magnetic film 63. The thin-film coil 64 is laid in an insulated state inside an insulating film 69 in an inner gap existing between the first magnetic layer 62 and the second magnetic film 63.

The upper pole portion P2 of the second magnetic film 63 faces the first pole portion P1 with the recording gap layer 65 between them. The second magnetic film 63 is coupled to the first magnetic layer 62 at the rear side being seen from the upper pole portion P2 side and thereby forms a thin-film magnetic circuit.

Figure 14:
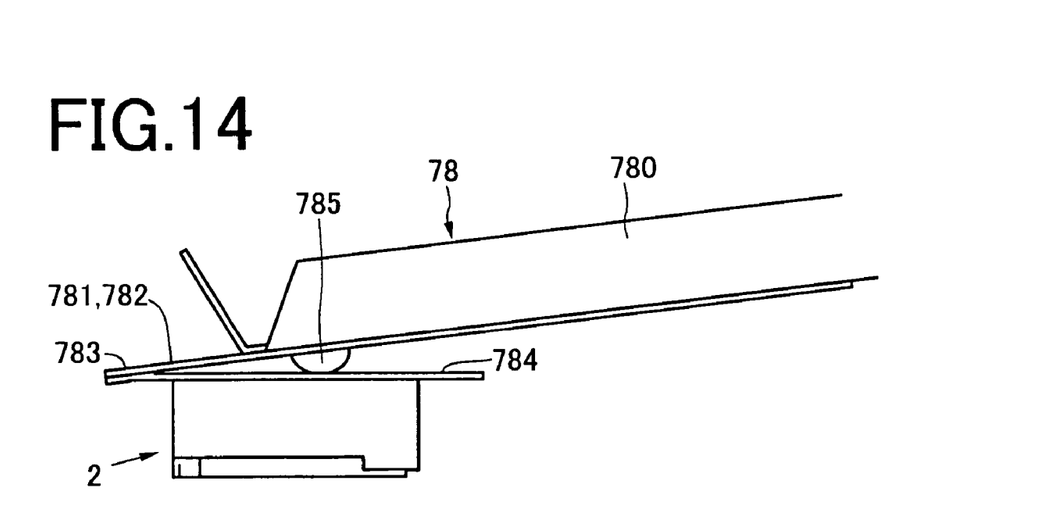
FIG. 14 is a front view of a magnetic head device used in the magnetic disk device of FIG. 10.
Figure 15:
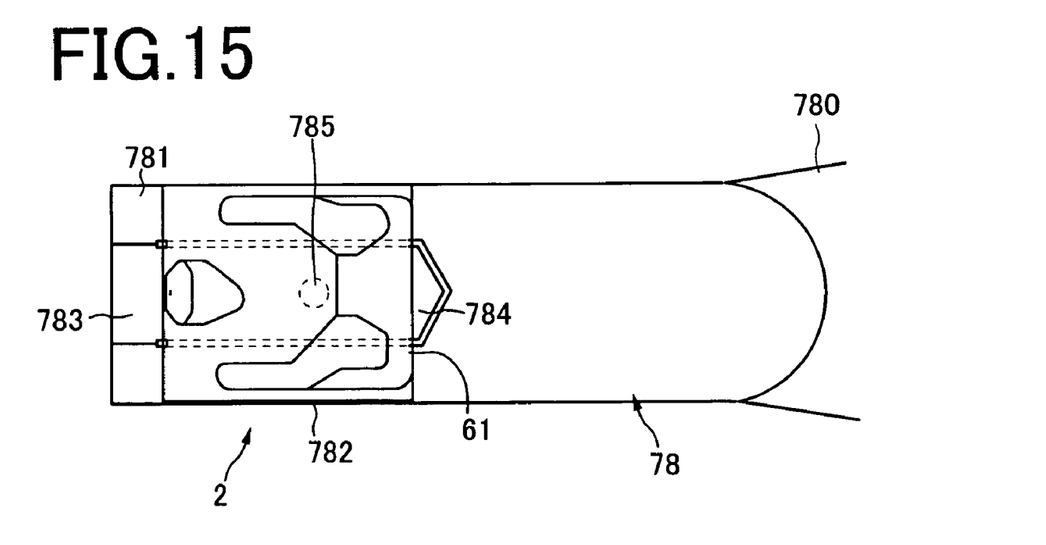
FIG. 15 is a bottom view of the magnetic head device shown in FIG. 14.

FIG. 14 is a front view of a magnetic head device used in the magnetic disk device of FIG. 10, and FIG. 15 is a bottom view of the magnetic head device shown in FIG. 14. The magnetic head device shown in FIG. 14 includes the thin-film magnetic head 2 shown in FIG. 13 and the head suspension 78. The head suspension 78 is of a structure in which a flexible member formed out of a metal sheet is attached to a free end being an end in the longitudinal direction of a support 780 formed similarly out of a metal sheet and the thin-film magnetic head 2 is attached to the lower face of this flexible member.

Concretely, the flexible member has two outer frame portions 781 and 782 extending nearly in parallel with the longitudinal axial line of the support 780, a lateral frame 783 coupling the outer frame portions 781 and 782 together at an end being distant from the support 780, and a tongue-shaped piece 784 extending nearly from the middle of the lateral frame 783 nearly in parallel with the outer frame portions 781 and 782 and having its fore-end made to be a free end. An end opposite to the side where the lateral frame 783 exists is attached closely to the free end of the support 780 by means of welding and the like.

The lower face of the support 780 is provided with a hemispherical projection 785 for load, for example. A load force is transferred by this projection 785 for load to the tongue-shaped piece 784 from the free end of the support 780.

The thin-film magnetic head 2 is attached to the lower face of the tongue-shaped piece 784 by means of adhesion and the like. The thin-film magnetic head 2 is supported so that a pitching action and a rolling action are tolerated.

A head suspension 78 being applicable in the present invention is not limited to the above-described embodiments but head supporting devices which have been proposed up to now or will be proposed after now can be widely applied. For example, a member obtained by forming a support 780 and a tongue-shaped piece 784 into one body using a flexible high-molecular wiring board of a TAB tape and the like may be used. And a support having a gimbals structure publicly known up to now can be freely used.

As described above, although the contents of the present invention have been concretely described with reference to the preferred embodiments, it is self-evident that person skilled in the art can take various variations on the basis of the basic technical ideas and teachings of the present invention.

What is claimed is:

1. A magnetic head driving circuit comprising a write circuit, wherein:
   the write circuit receives a write data signal inputted thereto, generates a write current based upon the inputted signal and outputs the write current;
   the write current includes a preamble portion and a user data portion in each sector for magnetic recording;
   the preamble portion is a section for preparation;
   the user data portion is a portion for data to be recorded and is generated after the preamble portion in time series; and
   the frequency f2 of the signal in the preamble portion is higher than half the frequency f1 of the signal in the user data portion,
   wherein the write current produces a thermal protrusion in a head to achieve a low flying height.

2. A magnetic head driving circuit according to claim 1, wherein:
   the frequency f2 of the signal in the preamble portion is an integral multiple of half the frequency f1 of the signal in the user data portion.

3. A magnetic head driving circuit according to claim 1, further comprising a read circuit.

4. A magnetic head driving circuit according to claim 1, wherein said frequency f2 is equal to said frequency f1.

5. A magnetic head driving circuit according to claim 1, wherein said frequency f2 is different than said frequency f1.

6. A magnetic head driving circuit comprising a write circuit, wherein:
   the write circuit receives a write data signal inputted thereto, generates a write current based upon the inputted signal and outputs the write current;
   the write current includes a preamble portion and a user data portion in each sector for magnetic recording;
   the preamble portion is a section for preparation;
   the user data portion is a part for data to be recorded and is generated after the preamble portion in time series; and
   a harmonic f3 of the frequency that is half the frequency f1 of the signal in the user data portion is superimposed on the frequency f2 of the signal in the preamble portion.

7. A magnetic head driving circuit according to claim 6, further comprising a read circuit.

8. A magnetic disk device comprising a magnetic head driving circuit, a magnetic head and a magnetic disk, wherein:
   the magnetic head driving circuit includes a write circuit, wherein:
      the write circuit receives a write data signal inputted thereto, generates a write current based upon the inputted signal and outputs the write current;
      the write current includes a preamble portion and a user data portion in each sector for magnetic recording;
      the preamble portion is a section for preparation;
      the user data portion is a portion for data to be recorded and is generated after the preamble portion in time series;
   the frequency f2 of the signal in the preamble portion is higher than half the frequency f1 of the signal in the user data portion,
   wherein the write current produces a thermal protrusion in a head to achieve a low flying height; and
   the magnetic head provides magnetic recording onto the magnetic disk by the write current that is supplied from the magnetic head driving circuit.

9. A magnetic disk device according to claim 8, wherein said frequency f2 is equal to said frequency f1.

10. A magnetic disk device according to claim 8, wherein said frequency f2 is different than said frequency f1.

11. A magnetic disk device comprising a magnetic head driving circuit, a magnetic head and a magnetic disk, wherein:

the magnetic head driving circuit includes a write circuit, wherein:
    the write circuit receives a write data signal inputted thereto, generates a write current based upon the inputted signal and outputs the write current;
    the write current includes a preamble portion and a user data portion in each sector for magnetic recording;
    the preamble portion is a section for preparation;
    the user data portion is a part for data to be recorded and is generated after the preamble portion in time series;
    a harmonic $f3$ of the frequency that is half the frequency $f1$ of the signal in the user data portion is superimposed on the frequency $f2$ of the signal in the preamble portion; and
the magnetic head provides magnetic recording onto the magnetic disk by the write current that is supplied from the magnetic head driving circuit.

\* \* \* \* \*